(12) United States Patent
Ohyama

(10) Patent No.: US 8,089,550 B2
(45) Date of Patent: Jan. 3, 2012

(54) IMAGE SENSING APPARATUS, CONTROL METHOD THEREOF, AND PROGRAM

(75) Inventor: Nana Ohyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/472,056

(22) Filed: May 26, 2009

(65) Prior Publication Data

US 2009/0303375 A1 Dec. 10, 2009

(30) Foreign Application Priority Data

Jun. 5, 2008 (JP) ................................. 2008-148323
Mar. 17, 2009 (JP) ................................. 2009-065222

(51) Int. Cl.
*H04N 5/222* (2006.01)
*G03B 13/02* (2006.01)

(52) U.S. Cl. ..................... 348/333.03; 348/346; 396/374

(58) Field of Classification Search ............. 348/333.01, 348/333.02, 333.03, 333.04, 333.12, 346; 396/374

See application file for complete search history.

(56) References Cited

U.S. PATENT DOCUMENTS

| | | | | |
|---|---|---|---|---|
| 5,041,911 A * | 8/1991 | Moorman | ....................... | 348/364 |
| 5,164,836 A * | 11/1992 | Jackson et al. | ................. | 348/364 |
| 5,877,809 A * | 3/1999 | Omata et al. | ................... | 348/345 |
| 6,535,245 B1 * | 3/2003 | Yamamoto | ................. | 348/223.1 |
| 7,129,980 B1 * | 10/2006 | Ashida | ..................... | 348/333.04 |
| 7,397,968 B2 * | 7/2008 | Stavely et al. | ................. | 382/274 |
| 7,773,132 B2 * | 8/2010 | Ozaki | ............................ | 348/241 |
| 2002/0154829 A1 * | 10/2002 | Tsukioka | ....................... | 382/254 |
| 2007/0177036 A1 | 8/2007 | Kawada | | |
| 2008/0309811 A1 * | 12/2008 | Fujinawa et al. | ........ | 348/333.01 |
| 2009/0231454 A1 * | 9/2009 | Miura | ......................... | 348/220.1 |
| 2009/0251568 A1 * | 10/2009 | Nakatani | ....................... | 348/234 |
| 2010/0097513 A1 * | 4/2010 | Takada et al. | ............ | 348/333.03 |
| 2010/0157129 A1 * | 6/2010 | Lee | ............................ | 348/333.04 |
| 2010/0259635 A1 * | 10/2010 | Oka | ............................. | 348/222.1 |

FOREIGN PATENT DOCUMENTS

| | | | |
|---|---|---|---|
| JP | 04-328964 | | 11/1992 |
| JP | 05260351 A | * | 10/1993 |
| JP | 2003250067 A | * | 9/2003 |
| JP | 2005078002 A | * | 3/2005 |
| JP | 2007266680 A | * | 10/2007 |
| JP | 2008054115 A | * | 3/2008 |
| JP | 2008099159 A | * | 4/2008 |

* cited by examiner

*Primary Examiner* — John Villecco

(74) *Attorney, Agent, or Firm* — Cowan, Liebowitz & Latman, P.C.

(57) ABSTRACT

An image sensing apparatus includes a display control unit which controls an image display unit to display an image sensed by an image input unit. The image sensing apparatus also includes a signal strength detection unit which detects, from a sensed image, a luminance area formed from pixels satisfying a predetermined luminance condition, and a special area detection unit which detects, from a sensed image, an object area having a predetermined feature. The display control unit controls the image display unit to display an assist image representing the luminance area, so as to be superimposed on a sensed image. The display control unit changes the assist image display method between a case in which the luminance area and object area overlap each other and a case in which they do not overlap each other.

17 Claims, 12 Drawing Sheets

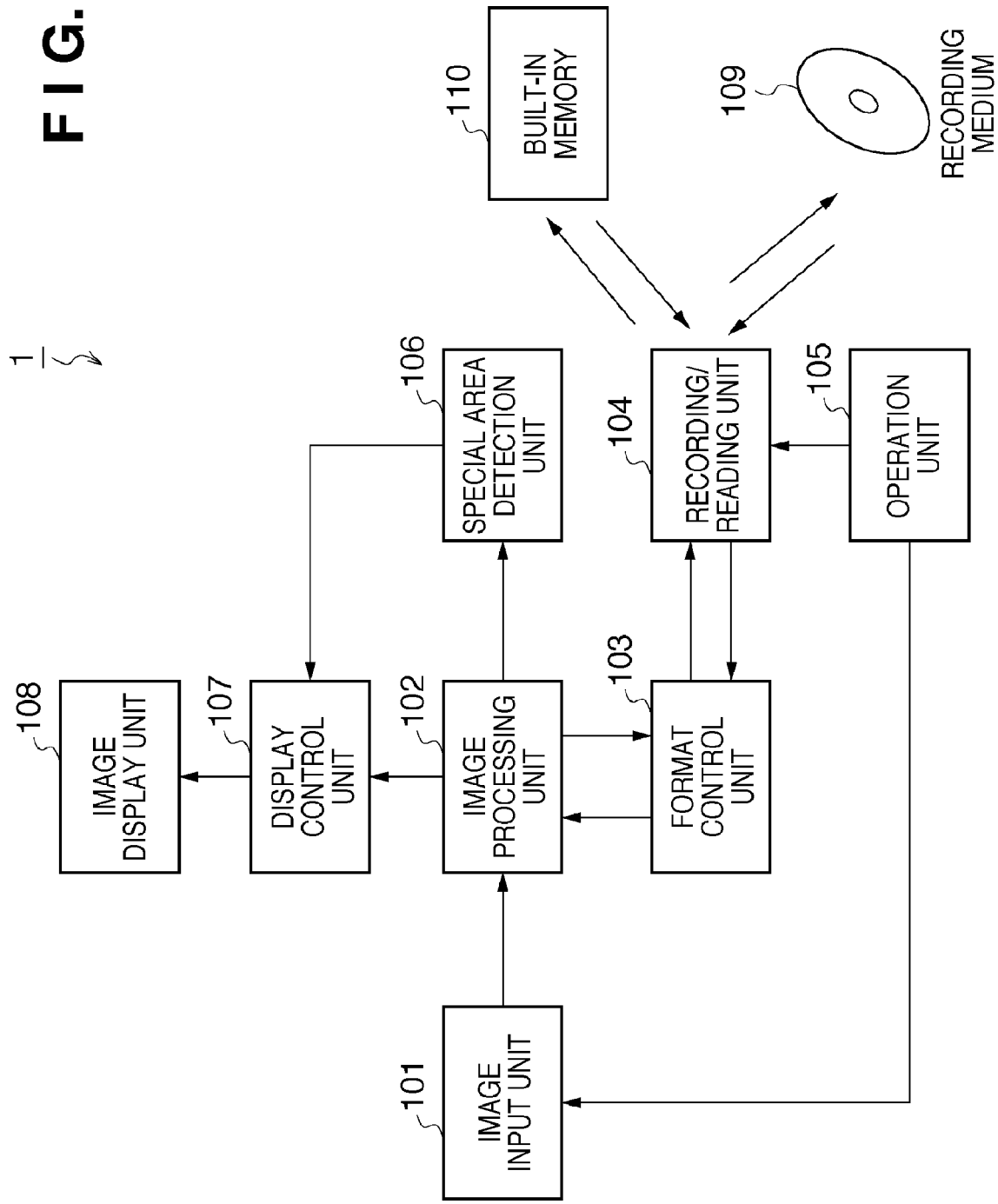

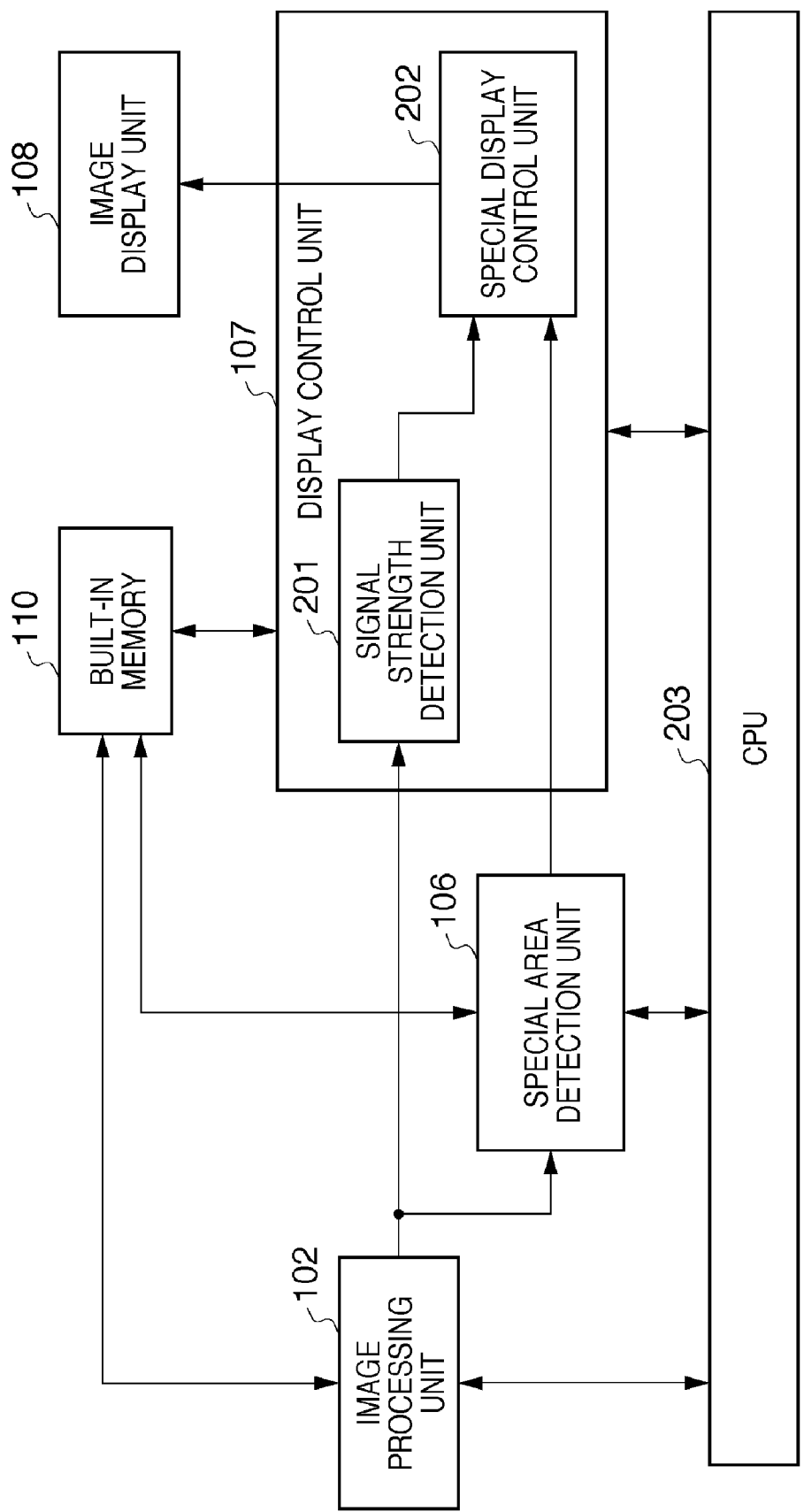

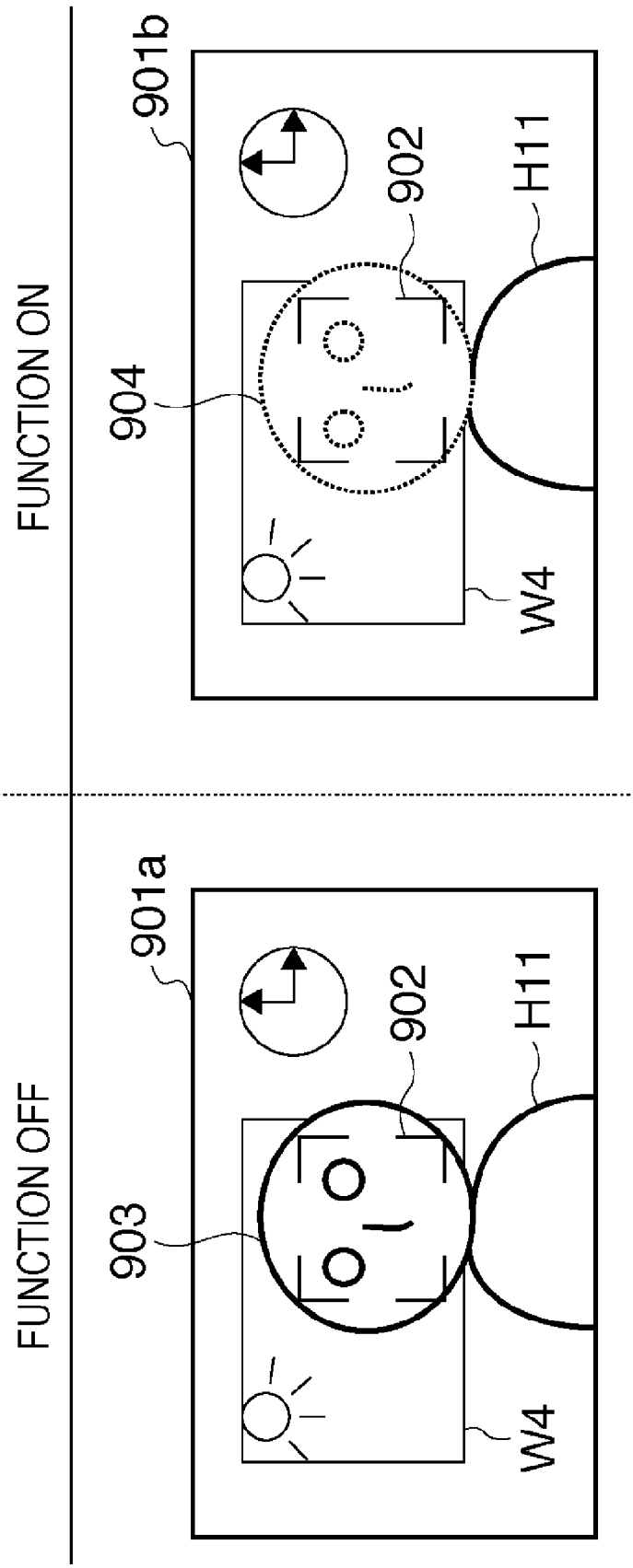

IMAGE SENSING APPARATUS, CONTROL METHOD THEREOF, AND PROGRAM

BACKGROUND OF THE INVENTION

1. Field of the Invention

The present invention relates to an image sensing apparatus, control method thereof, and program.

2. Description of the Related Art

Conventional image sensing apparatuses such as a digital video camera include a display unit for displaying a sensed image, such as an electronic viewfinder (EVF) or liquid crystal display monitor. The user of the image sensing apparatus performs exposure control and focus adjustment while visually checking a sensed image on the display unit. However, most display units in image sensing apparatuses are small in size and are not suitable for strict exposure control and focus adjustment in terms of the display resolution.

From this, some image sensing apparatuses assist user operation by displaying an image for assisting exposure control or one for assisting focus adjustment, so as to be superimposed on a sensed image on the display unit. An example of the exposure control assist image is a pattern image (to be referred to as a "zebra pattern" hereinafter) of hatched lines, which is called a zebra pattern signal generated based on a preset luminance value and the luminance range of a sensed image. An example of the focus adjustment assist image is an edge image which is generated by extracting edge signals from a sensed image and is displayed to be superimposed on a sensed image. The edge image is obtained by edge correction, peaking, or enhancer (to be referred to as "peaking" hereinafter).

For example, the luminance range for displaying a zebra pattern is set to a predetermined level convenient for stop adjustment. In general, the threshold of the luminance level or a predetermined luminance level range is set according to IRE (Institute of Radio Engineers) used as a unit representing the amplitude of a video signal. The IRE has originally meant a standard defined by the Institute of Radio Engineers (IEEE now), and is generally used as a unit. The IRE defines pedestal level (black)=0 IRE (in some cases, black=7.5 IRE), and white=100 IRE. When manually controlling the exposure, the luminance level range is set to about 70 IRE to 100 IRE. A zebra pattern is displayed to be superimposed in the image area of a sensed image that corresponds to this range.

Japanese Patent Laid-Open No. 4-328964 is known as a technique of displaying an assist image to be superimposed on a sensed image. Japanese Patent Laid-Open No. 4-328964 discloses a technique of displaying zebra patterns in the image area of a signal strength equal to or higher than an arbitrary luminance level and that of a signal strength equal to or lower than the luminance level.

The conventional technique simply displays an assist image to be superimposed in an image area or in-focus area which satisfies a predetermined luminance condition. This technique displays an assist image even in an image area overlapping an object area having a predetermined feature, like a face area containing a person's face.

SUMMARY OF THE INVENTION

The present invention provides an image sensing apparatus which displays an assist image while discriminating an area overlapping an object area having a predetermined feature from the remaining area when displaying the assist image in an image area or in-focus area which satisfies a predetermined luminance condition, a control method thereof, and a program.

According to the first aspect of the present invention, there is provided an image sensing apparatus comprising an image sensing unit, a display unit, a display control unit which controls the display unit to display an image sensed by the image sensing unit, a first detection unit which detects, from the sensed image, a luminance area formed from pixels satisfying a predetermined luminance condition, and a second detection unit which detects an object area having a predetermined feature from the sensed image, wherein the display control unit controls the display unit to display an assist image representing the luminance area detected by the first detection unit, so as to be superimposed on the sensed image, and changes a display method of the assist image between a case in which the luminance area and the object area detected by the second detection unit overlap each other, and a case in which the luminance area and the object area do not overlap each other.

According to the second aspect of the present invention, there is provided an image sensing apparatus comprising an image sensing unit, a display unit, a display control unit which controls the display unit to display an image sensed by the image sensing unit, a first detection unit which detects, from the sensed image, a luminance area formed from pixels satisfying a predetermined luminance condition, and a second detection unit which detects an object area having a predetermined feature from the sensed image, wherein the display control unit controls the display unit to display a pattern display representing the luminance area detected by the first detection unit, so as to be superimposed on the sensed image, and changes a display method of the pattern display between a case in which the luminance area and the object area detected by the second detection unit overlap each other, and a case in which the luminance area and the object area do not overlap each other.

According to the third aspect of the present invention, there is provided an image sensing apparatus comprising an image sensing unit, a display unit, a display control unit which controls the display unit to display an image sensed by the image sensing unit, a first detection unit which detects an edge of an object from the sensed image, and a second detection unit which detects an object area containing a person's face from the sensed image, wherein the display control unit controls the display unit to display a peaking display representing the edge of the object detected by the first detection unit, so as to be superimposed on the sensed image, and changes a display method of the peaking display between a case in which the edge of the object falls within the object area detected by the second detection unit, and a case in which the edge of the object falls outside the object area.

According to the fourth aspect of the present invention, there is provided a method of controlling an image sensing apparatus having an image sensing unit and a display unit, the method comprising a display control step of controlling the display unit to display an image sensed by the image sensing unit, a first detection step of detecting, from the sensed image, a luminance area formed from pixels satisfying a predetermined luminance condition, and a second detection step of detecting an object area having a predetermined feature from the sensed image, wherein in the display control step, the display unit is controlled to display an assist image representing the luminance area, so as to be superimposed on the sensed image, and a display method of the assist image is changed between a case in which the luminance area and the object area overlap each other and a case in which the luminance area and the object area do not overlap each other.

According to the fifth aspect of the present invention, there is provided a method of controlling an image sensing apparatus having an image sensing unit and a display unit, the method comprising a display control step of controlling the display unit to display an image sensed by the image sensing unit, a first detection step of detecting, from the sensed image, a luminance area formed from pixels satisfying a predetermined luminance condition, and a second detection step of detecting an object area having a predetermined feature from the sensed image, wherein in the display control step, the display unit is controlled to display a pattern display representing the luminance area, so as to be superimposed on the sensed image, and a display method of the pattern display is changed between a case in which the luminance area and the object area overlap each other and a case in which the luminance area and the object area do not overlap each other.

According to the sixth aspect of the present invention, there is provided a method of controlling an image sensing apparatus having an image sensing unit and a display unit, the method comprising a display control step of controlling the display unit to display an image sensed by the image sensing unit, a first detection step of detecting an edge of an object from the sensed image, and a second detection step of detecting an object area containing a person's face from the sensed image, wherein in the display control step, the display unit is controlled to display a peaking display representing the edge of the object, so as to be superimposed on the sensed image, and a display method of the peaking display is changed between a case in which the edge of the object falls within the object area, and a case in which the edge of the object falls outside the object area.

Further features of the present invention will become apparent from the following description of exemplary embodiments with reference to the attached drawings.

BRIEF DESCRIPTION OF THE DRAWINGS

FIG. 1 is a block diagram schematically showing the functional arrangement of an image sensing apparatus according to the present invention;

FIG. 2 is a block diagram showing the schematic arrangement of a display control unit;

FIG. 12 is a conceptual view exemplifying a sensed image displayed on an image display unit in the fifth embodiment.

DESCRIPTION OF THE EMBODIMENTS

Embodiments of the present invention will be described below with reference to the accompanying drawings, but the present invention is not limited to them. The following embodiments of the present invention are merely examples for embodying the invention, and may not be construed to limit the scope of the present invention.

First Embodiment

Figure 3A:
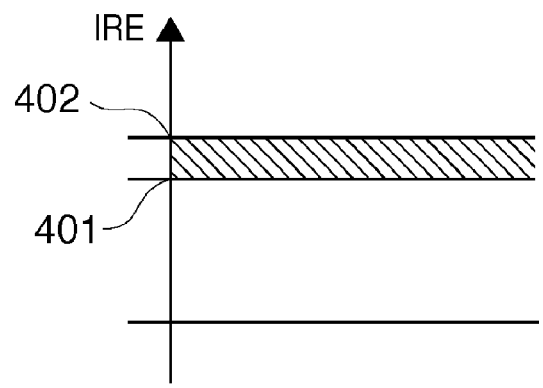
FIG. 3A is a conceptual view showing a luminance condition associated with zebra pattern display.
Figure 3B:
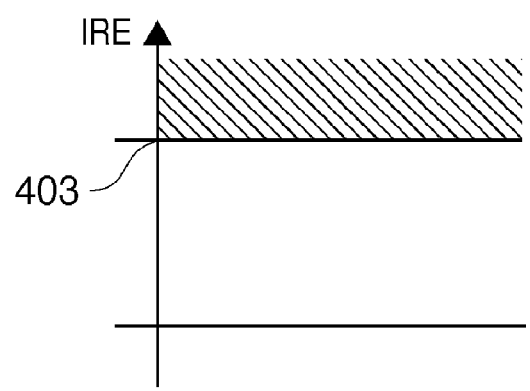
FIG. 3B is a conceptual view showing a luminance condition associated with zebra pattern display.
Figure 3C:
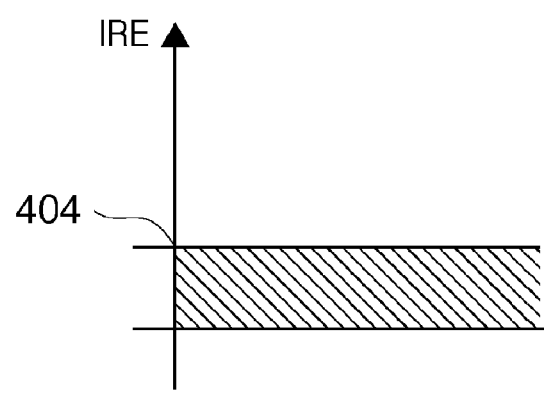
FIG. 3C is a conceptual view showing a luminance condition associated with zebra pattern display.
Figure 4:
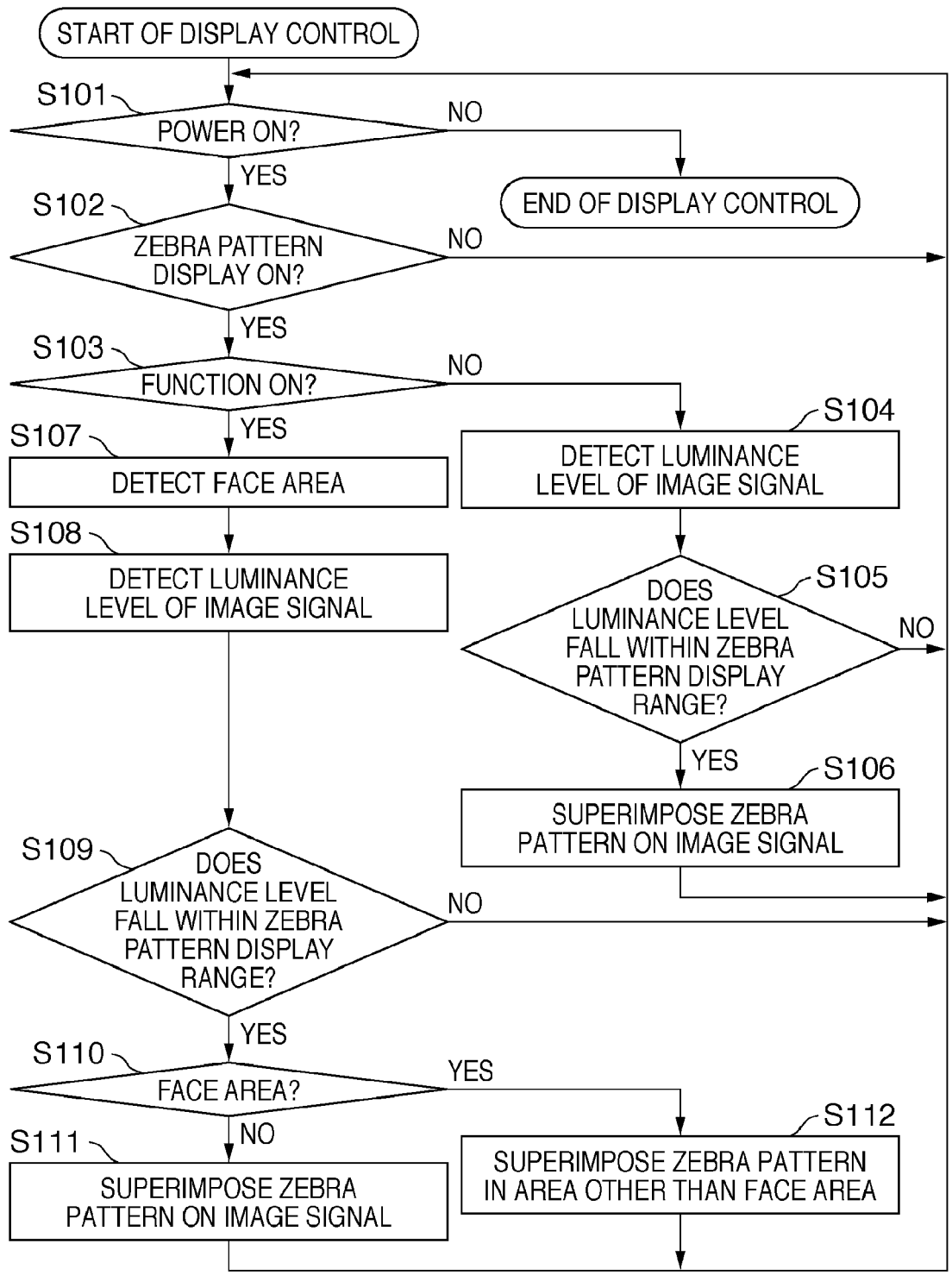
FIG. 4 is a flowchart showing the display control operation of an image sensing apparatus according to the first embodiment.
Figure 5:
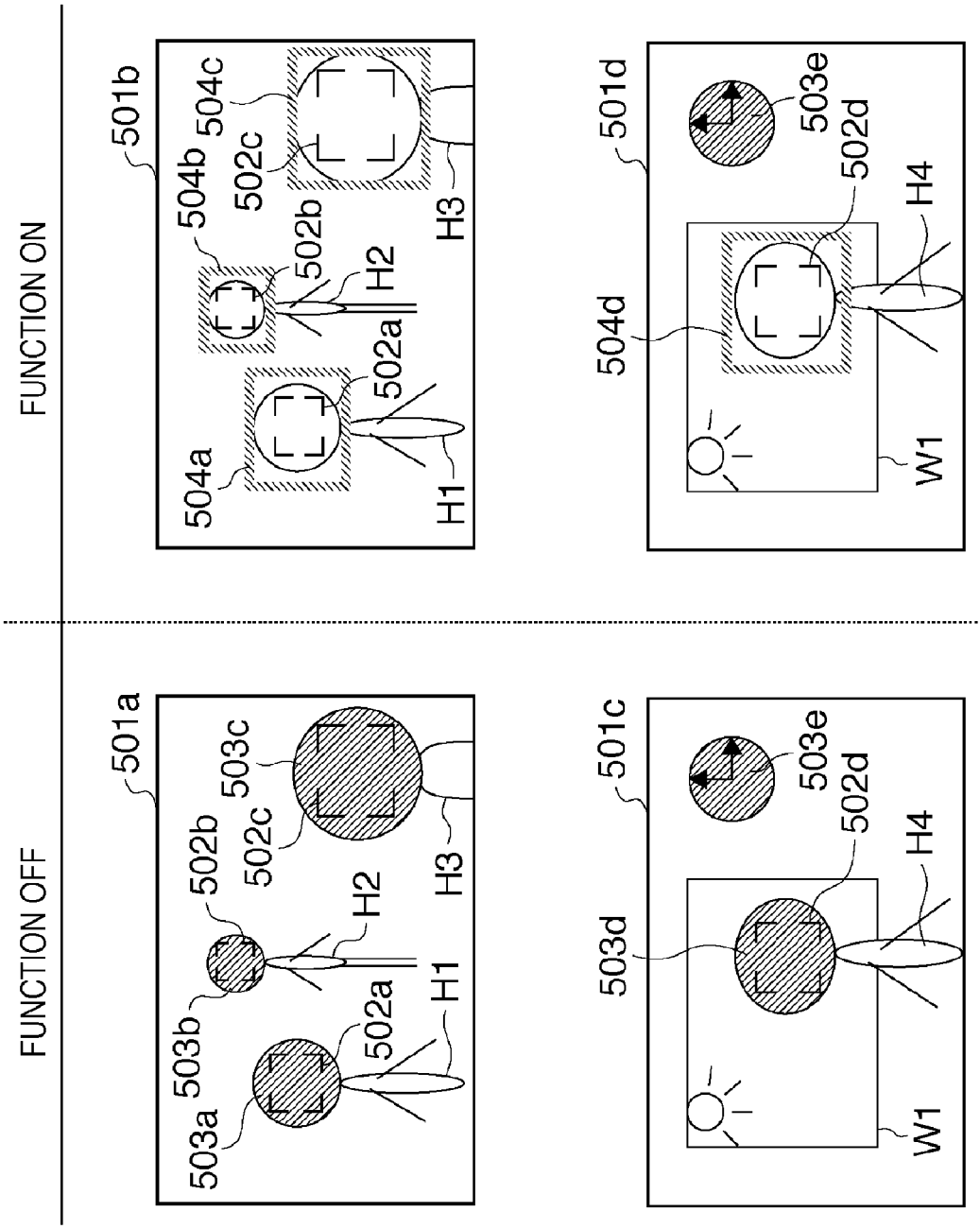
FIG. 5 is a conceptual view exemplifying a sensed image displayed on an image display unit in the first embodiment.

An image sensing apparatus according to the first embodiment of the present invention will be described in detail below with reference to FIGS. 1 to 5. FIG. 1 is a block diagram schematically showing the functional arrangement of an image sensing apparatus 1 according to the present invention. FIG. 2 is a block diagram showing the schematic arrangement of a display control unit 107. FIGS. 3A to 3C are conceptual views showing luminance conditions associated with zebra pattern display. FIG. 4 is a flowchart showing the display control operation of the image sensing apparatus 1. FIG. 5 is a conceptual view exemplifying a sensed image displayed on an image display unit 108.

As shown in FIG. 1, the image sensing apparatus 1 can record image data input from an image input unit 101 on a recording medium 109 such as an optical disk, hard disk, or semiconductor memory card. The image sensing apparatus 1 includes the image input unit 101, an image processing unit 102, a format control unit 103, a recording/reading unit 104, an operation unit 105, a special area detection unit 106, the display control unit 107, the image display unit 108, and a built-in memory 110.

The image input unit 101 is an image sensing unit formed from, e.g., a plurality of optical lenses and a CCD (Charge Coupled Device) or CMOS (Complementary Metal Oxide Semiconductor) image sensor. Data of an image (to be referred to as a "sensed image" hereinafter) input from the image input unit 101 is output to the image processing unit 102. The image processing unit 102 performs predetermined image processing such as tone conversion for sensed image data output from the image input unit 101 or image data read out from the recording medium 109.

The format control unit 103 converts the data format of input data into a data format displayable on the image display unit 108 or a data format suited to recording on the recording medium 109. For example, the format control unit 103 converts still image data into JPEG (Joint Photographic Experts Group) data and vice versa. Also, the format control unit 103 converts moving image data into an MPEG (Moving Picture Experts Group) moving image data and vice versa. The recording/reading unit 104 includes a module for read/write from/on a disk, and an interface for connecting a semiconductor memory card. The recording/reading unit 104 records data converted by the format control unit 103 on the recording medium 109, and reads out data from the recording medium 109.

The operation unit 105 includes buttons and switches attached to the housing of the image sensing apparatus 1. The operation unit 105 accepts an operation input from the user. More specifically, the operation unit 105 accepts a power operation with a power switch, an image sensing operation with a shutter switch, a function setting operation with a function switch for setting various functions, and a setting operation with a setting switch for adjusting image sensing conditions and the like.

Based on preset special image information, the special area detection unit 106 serving as the second detection unit detects a special image area contained in image data processed by the image processing unit 102. Examples of the special image area are a face area including a person's face, and an in-focus area. The special image information includes information necessary to specify a face in an image, and information necessary to extract an in-focus area. When detecting a face area, the special area detection unit 106 detects it from the image area of image data based on special image information containing a feature amount associated with a face image, such as the position of an eye, mouth, or nose, or the edge of a face. When detecting an in-focus area, the special area detection unit 106 detects it from the image area of image data based on special image information containing a contrast value serving as the criterion of the in-focus state. Upon receiving sensed image data from the image input unit 101, the special area detection unit 106 detects an object area such as a face area or in-focus area contained in the sensed image. The special area detection unit 106 supplies information on the detection result to the display control unit 107.

The display control unit 107 serving as a display control unit controls the image display unit 108 to display an image output from the image processing unit 102 on the display screen of the image display unit 108. More specifically, the display control unit 107 accepts image data of images successively sensed by the image input unit 101 from the image processing unit 102, and controls the image display unit 108 to sequentially display them. The image display unit 108 is an electronic viewfinder (EVF) or liquid crystal display monitor. The image display unit 108 displays an image on the display screen under the control of the display control unit 107. While checking images which are successively sensed by the image input unit 101 and sequentially displayed on the image display unit 108, the user can use the operation unit 105 to perform adjustment of image sensing conditions (e.g., focus adjustment or exposure control) in the image input unit 101.

The built-in memory 110 is a RAM (Random Access Memory) or ROM (Read Only Memory). The built-in memory 110 provides a temporary storage for sensed image data, and a work area for performing a variety of data processes. The built-in memory 110 stores in advance program data to be executed by a CPU (Central Processing Unit), set conditions used for determination of the signal strength and the like, and various kinds of setting information such as special image information. The built-in memory 110 is organically connected to the CPU of the image sensing apparatus 1 and other functional blocks, details of which will be described with reference to FIG. 2.

In the image sensing apparatus 1, the image processing unit 102 executes image processing for image data sensed by the image input unit 101. The format control unit 103 converts the processed sensed image data into a format recordable on the recording medium 109. The recording/reading unit 104 records, on the recording medium 109, the sensed image data converted by the format control unit 103. The special area detection unit 106 and display control unit 107 receive the sensed image data having undergone image processing by the image processing unit 102. The special area detection unit 106 detects a special image area such as a face area or in-focus area from input sensed image data, and outputs the detection result to the display control unit 107. The display control unit 107 controls the display of the image display unit 108 based on the sensed image data input from the image processing unit 102 and the detection result input from the special area detection unit 106. The display control unit 107 controls the image display unit 108 to display an image on its display screen.

The recording/reading unit 104 reads out image data recorded on the recording medium 109, and the format control unit 103 converts the readout image data into a displayable/outputtable format. The image processing unit 102 performs image processing for the image data converted by the format control unit 103. Then, the display control unit 107 receives the image data having undergone image processing, and controls the image display unit 108 to display it as an image on the display screen.

The display control unit 107 will be explained in detail. As shown in FIG. 2, the display control unit 107 includes a signal strength detection unit 201 and special display control unit 202. The display control unit 107 controls the screen display of the image display unit 108 under the control of a CPU 203. The CPU 203 reads out program data stored in the built-in memory 110, and comprehensively controls the respective units of the image sensing apparatus 1 in cooperation with the program data.

The signal strength detection unit 201 serving as the first detection unit determines whether the signal strength of each pixel of image data input from the image processing unit 102 satisfies a condition set in advance in the built-in memory 110. More specifically, based on image data input from the image processing unit 102, the signal strength detection unit 201 detects at least one of a luminance area and in-focus area formed from pixels satisfying a predetermined luminance condition. In an image area containing pixels determined by the signal strength detection unit 201 to have a signal strength satisfying the set condition in an image based on image data input from the image processing unit 102, the special display control unit 202 displays an assist image representing the determination result, so as to be superimposed in the image area.

For example, when the signal strength of each pixel that is detected by the signal strength detection unit 201 is a signal strength associated with luminance, an assist image is displayed to be superimposed in an image area formed from pixels satisfying a set condition serving as a preset luminance condition. The assist image can be a zebra pattern image obtained by patterning a luminance area satisfying the set condition into a pattern image of hatched lines. That is, when displaying a sensed image on the image display unit 108, the image sensing apparatus 1 displays a generated zebra pattern image to be superimposed in an area satisfying a preset luminance condition in accordance with the luminance level of each pixel in the sensed image. The user can control the exposure by referring to the zebra pattern image.

The user may use the operation unit 105 to set the condition (e.g., luminance) in advance in the built-in memory 110 to display an assist image by superimposition. As for the set condition for the luminance, a lower limit luminance level 401 and upper limit luminance level 402 may also be set based on IRE or the like as a luminance range for displaying a zebra pattern, as shown in FIG. 3A. A luminance level 403 serving as a lower limit threshold for displaying a zebra pattern as shown in FIG. 3B, or a luminance level 404 serving as an upper limit threshold as shown in FIG. 3C may also be set based on IRE or the like.

The signal strength detection unit 201 may also detect an in-focus area or the edge of an object by determining whether the signal strength difference between pixels of image data input from the image processing unit 102 satisfies a preset condition. For example, the in-focus area may also be detected according to a contrast method of determining, as an in-focus area, an image area where the contrast value is equal to or larger than a predetermined threshold. When detecting the edge of an object, the special display control unit 202 displays an assist image to be superimposed on an image displayed on the image display unit 108, based on image data input from the image processing unit 102. The assist image represents an edge based on the edge detection result of the signal strength detection unit 201. The assist image representing the edge is an image used for performing peaking described above. This image represents an edge line based on the edge detection result by a predetermined line type (e.g., dotted line or bold line) and a predetermined display color. That is, when displaying a sensed image on the image display unit 108, the image sensing apparatus 1 presents a peaking display extracted from a sensed image, so as to be superimposed on the sensed image. The user can adjust the focus by referring to the peaking display.

Based on the detection result of the special area detection unit 106, the special display control unit 202 controls the method of displaying an assist image such as a zebra pattern or peaking display to be superimposed on an image displayed on the image display unit 108. More specifically, the special display control unit 202 changes the assist image display method between an area overlapping a special image area in the image area of image data, and an area overlapping no special image area. When displaying an assist image such as a zebra pattern or peaking display on the image display unit 108, the image sensing apparatus 1 can display it while discriminating an area overlapping a special image area in a sensed image from an area overlapping no special image area.

For example, when the special area detection unit 106 detects a face area as a special image area, the display method is changed between a zebra pattern or peaking display in the face area and a zebra pattern or peaking display in the remaining area. Similarly, when the special area detection unit 106 detects an in-focus area as a special image area, the display method is changed between a zebra pattern or peaking display in the in-focus area and a zebra pattern or peaking display in the remaining area. In this way, the image sensing apparatus 1 can display an assist image such as a pattern display (e.g., zebra pattern) or peaking display while changing the assist image display method between face and in-focus areas and the remaining image area.

Processing by the display control unit 107 will be explained. This processing is executed as the display control operation of the image sensing apparatus 1 under the control of the CPU 203 according to the first embodiment. In the first embodiment, the image display unit 108 displays a zebra pattern to be superimposed on an image sensed by the image input unit 101. A special image area detected by the special area detection unit 106 is a face area. When the sum of pixels to display an assist image in an object area detected by the special area detection unit 106 becomes equal to or larger than a predetermined ratio, the function of the present invention is enabled to change the assist image display method. For example, in the first embodiment, when the sum of pixels to display a zebra pattern in a face area detected by the special area detection unit 106 becomes equal to or larger than 50% of all pixels in the face area, the assist image display method is changed. For descriptive convenience, the first embodiment will be described on the premise that the sum of pixels to display an assist image in an object area detected by the special area detection unit 106 is always equal to or larger than a predetermined ratio (e.g., 50%).

As shown in FIG. 4, when display control processing starts, the display control unit 107 determines whether the user has turned on the image sensing apparatus 1 with the power switch of the operation unit 105 or the like (S101). If the display control unit 107 determines that the user has turned on the image sensing apparatus 1 (YES in S101), it determines whether the user has set zebra pattern display ON with the setting switch of the operation unit 105 or the like (S102). If the display control unit 107 determines that the user has set zebra pattern display ON (YES in S102), it determines whether the user has set, ON with the function switch of the operation unit 105 or the like, a function of performing display control based on a face area detected by the special area detection unit 106 (S103).

If the display control unit 107 determines that the function of performing display control based on a face area is OFF (NO in S103), it detects the luminance level of an image signal corresponding to each pixel of an input sensed image (S104). Then, the display control unit 107 determines whether the detected luminance level of the image signal corresponding to each pixel satisfies a preset condition and falls within a luminance level range for displaying a zebra pattern (S105). If the display control unit 107 determines that the detected luminance level of the image signal corresponding to each pixel falls within the luminance level range for displaying a zebra pattern (YES in S105), it superimposes a zebra pattern on the image signal (S106). If the display control unit 107 determines that the detected luminance level of the image signal corresponding to each pixel falls outside the luminance level range for displaying a zebra pattern (NO in S105), it does not superimpose a zebra pattern on the image signal. The display control unit 107 repeats the processes in S101 to S106 until the image sensing apparatus 1 is turned off.

If the display control unit 107 determines that the function of performing display control based on a face area is ON (YES in S103), the special area detection unit 106 detects a face area from the sensed image (S107). Similar to S104 and S105, the display control unit 107 detects the luminance level of an image signal corresponding to each pixel of the input sensed image (S108). The display control unit 107 determines whether the detected luminance level of the image signal falls within the luminance level range for displaying a zebra pattern (S109). If the display control unit 107 determines that the detected luminance level of the image signal corresponding to each pixel falls outside the luminance level range for displaying a zebra pattern (NO in S109), it does not superimpose a zebra pattern on the image signal.

If the display control unit 107 determines that the detected luminance level of the image signal corresponding to each pixel falls within the luminance level range for displaying a zebra pattern (YES in S109), it determines whether the image signal is that of a pixel falling within the face area detected by the special area detection unit 106 (S110). If the display control unit 107 determines that the image signal is not that of a pixel falling within the face area (NO in S110), it superimposes a zebra pattern on the image signal (S111). If the display control unit 107 determines that the image signal is that of a pixel falling within the face area (YES in S110), it superimposes a zebra pattern in an image area other than the face area (S112). The display control unit 107 repeats the processes in S101 to S103 and S107 to S112 until the image sensing apparatus 1 is turned off.

By this processing, the image display unit 108 of the image sensing apparatus 1 displays a sensed image exemplified in FIG. 5. Referring to FIG. 5, sensed images 501a and 501b are sensed images of persons H1 to H3. Sensed images 501c and 501d are sensed images of a person H4 with a window frame W1 in the background. The image display unit 108 displays the sensed images 501a and 501c when the function of performing display control based on a face area is OFF. The image display unit 108 displays the sensed images 501b and 501d when the function is ON.

When the function of performing display control based on a face area is OFF, zebra patterns 503a to 503e are displayed to be superimposed in face areas 502a to 502d of the persons H1 to H4 and other areas such as a clock without discriminating the face areas and other areas, like the sensed images 501a and 501c. When the function of performing display control based on a face area is ON, no zebra pattern is displayed in the face areas 502a to 502d of the persons H1 to H4 that are detected as special image areas, and zebra patterns 504a to 504d are displayed in outer image areas along the edges of the face areas. The zebra pattern 503e for the clock or the like other than the face areas is kept displayed. That is, the image sensing apparatus 1 displays a zebra pattern while changing the display method of zebra pattern display between a face area and the remaining image area.

Second Embodiment

Figure 6:
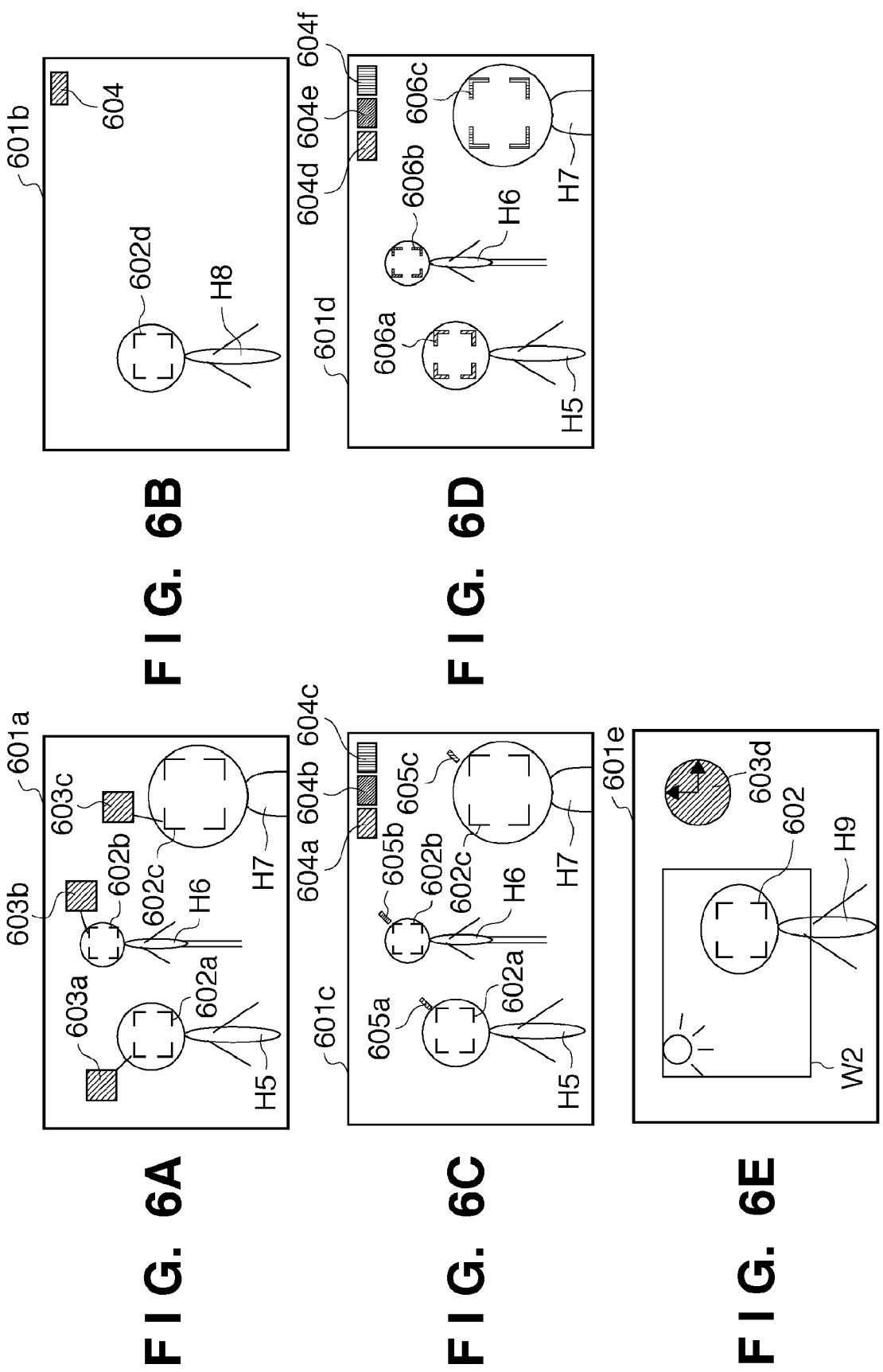
FIG. 6A is a conceptual view exemplifying a sensed image displayed on the image display unit in the second embodiment.
FIG. 6B is a conceptual view exemplifying a sensed image displayed on the image display unit in the second embodiment.
FIG. 6C is a conceptual view exemplifying a sensed image displayed on the image display unit in the second embodiment.
FIG. 6D is a conceptual view exemplifying a sensed image displayed on the image display unit in the second embodiment.
FIG. 6E is a conceptual view exemplifying a sensed image displayed on the image display unit in the second embodiment.

An image sensing apparatus according to the second embodiment will be described in detail with reference to FIGS. 6A to 6E. The second embodiment is directed to a modification of the display form described with reference to FIG. 5 in the first embodiment. The arrangement of the apparatus and the contents of processing are the same as those in the first embodiment, and a description thereof will not be repeated. FIGS. 6A to 6E are conceptual views exemplifying sensed images displayed on an image display unit in the second embodiment. FIG. 6A is a conceptual view exemplifying a sensed image 601a. FIG. 6B is a conceptual view exemplifying a sensed image 601b. FIG. 6C is a conceptual view exemplifying a sensed image 601c. FIG. 6D is a conceptual view exemplifying a sensed image 601d. FIG. 6E is a conceptual view exemplifying a sensed image 601e.

As shown in FIG. 6A, the sensed image 601a is a sensed image of persons H5 to H7. An image display unit 108 displays the sensed image 601a when the function of performing display control based on a face area is ON. Zebra patterns for face areas 602a to 602c of the persons H5 to H7 may also be displayed as zebra patterns 603a to 603c in tag areas associated with the face areas 602a to 602c, like the sensed image 601a.

As shown in FIG. 6B, the sensed image 601b is a sensed image of a person H8. The image display unit 108 displays the sensed image 601b when the function of performing display control based on a face area is ON. A zebra pattern for a face area 602d of the person H8 may also be displayed as a zebra pattern 604 in a display area set at the end of the screen, like the sensed image 601b. When displaying a zebra pattern, as represented by the sensed image 601b, it is not superimposed in an area overlapping an object area such as the face area 602d of the person H8, but is displayed in an area other than the overlapping object area. For example, the zebra pattern may also be displayed around the object area.

As shown in FIG. 6C, the sensed image 601c is a sensed image of the persons H5 to H7. The image display unit 108 displays the sensed image 601c when the function of performing display control based on a face area is ON. In the sensed image 601c, tag images 605a to 605c are set for the detected face areas 602a to 602c of the persons H5 to H7. An area for displaying zebra patterns 604a to 604c corresponding to the tag images 605a to 605c is set at, e.g., the end of the screen at which the area does not overlap a face area. When there are a plurality of face areas, the zebra patterns 604a to 604c corresponding to the respective face areas are displayed side by side in the area at the end of the screen. In this fashion, zebra patterns for the face areas 602a to 602c of the persons H5 to H7 may also be displayed in correspondence with the tag images 605a to 605c of the face areas 602a to 602c in an area at the end of the screen or the like at which the area does not overlap a face area. At this time, each of the tag images 605a to 605c and a corresponding one of the zebra patterns 604a to 604c may also be made to correspond to each other by a display form using the same display color, same hatching, or the like.

As shown in FIG. 6D, the sensed image 601d is a sensed image of the persons H5 to H7. The image display unit 108 displays the sensed image 601d when the function of performing display control based on a face area is ON. In the sensed image 601d, face area frames 606a to 606c are set in the detected face areas of the persons H5 to H7. An area for displaying zebra patterns 604d to 604f corresponding to the face area frames 606a to 606c is set at, e.g., the end of the screen at which the area does not overlap a face area. When there are a plurality of face areas, the zebra patterns 604d to 604f corresponding to the respective face areas are displayed in the area at the end of the screen. Zebra patterns for the face areas of the persons H5 to H7 may also be displayed as the zebra patterns 604d to 604f corresponding to the face area frames 606a to 606c in an area at the end of the screen or the like at which the area does not overlap a face area. At this time, each of the face area frames 606a to 606c and a corresponding one of the zebra patterns 604d to 604f may also be made to correspond to each other by a display form using the same display color, same hatching, or the like.

As shown in FIG. 6E, the sensed image 601e is a sensed image of a person H9 with a window frame W2 in the background. The image display unit 108 displays the sensed image 601e when the function of performing display control based on a face area is ON. A zebra pattern for a detected face area 602 of the person H9 may not be displayed, like the sensed image 601e.

Third Embodiment

Figure 7:
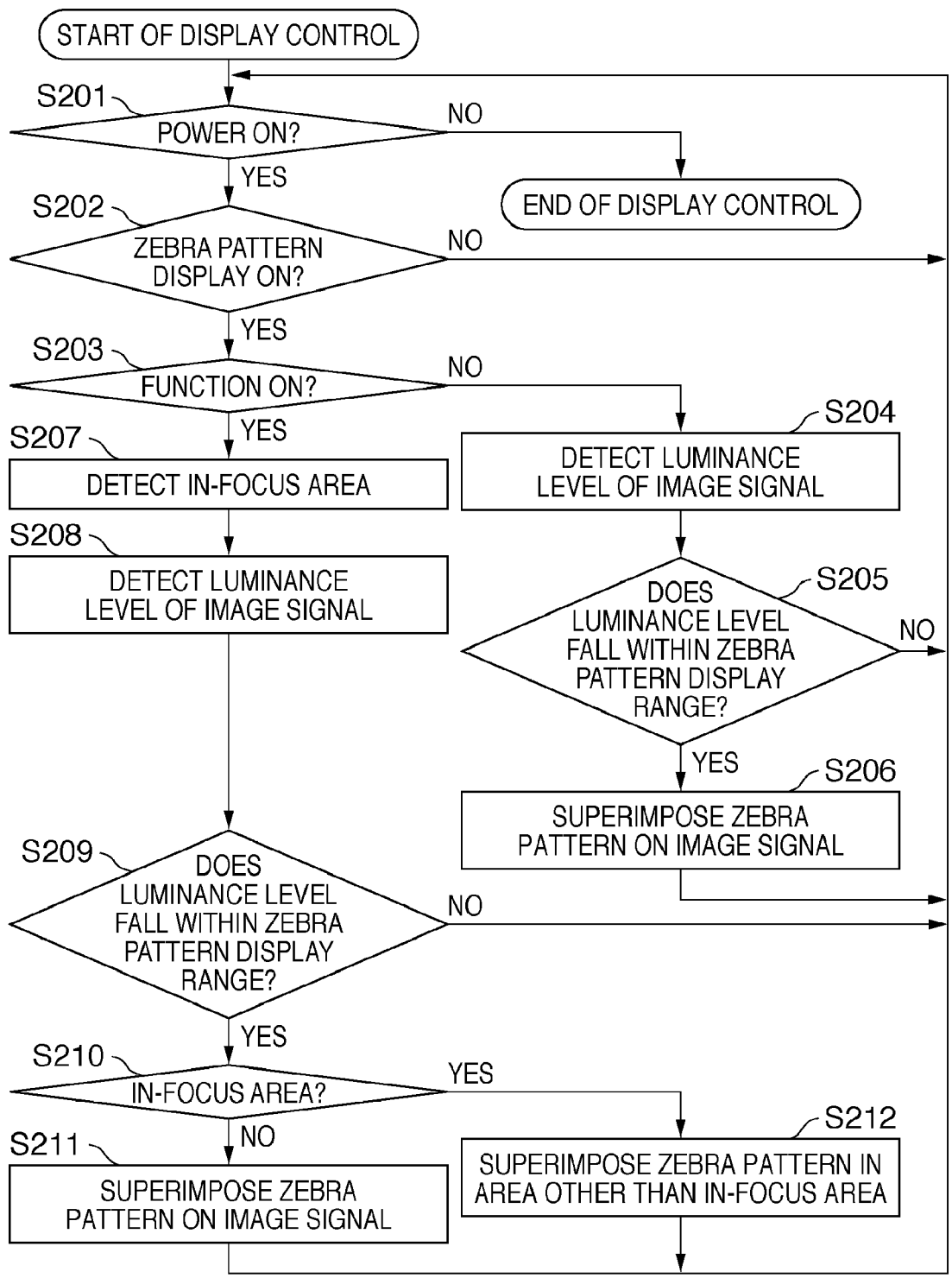
FIG. 7 is a flowchart showing the display control operation of an image sensing apparatus according to the third embodiment.
Figure 8:
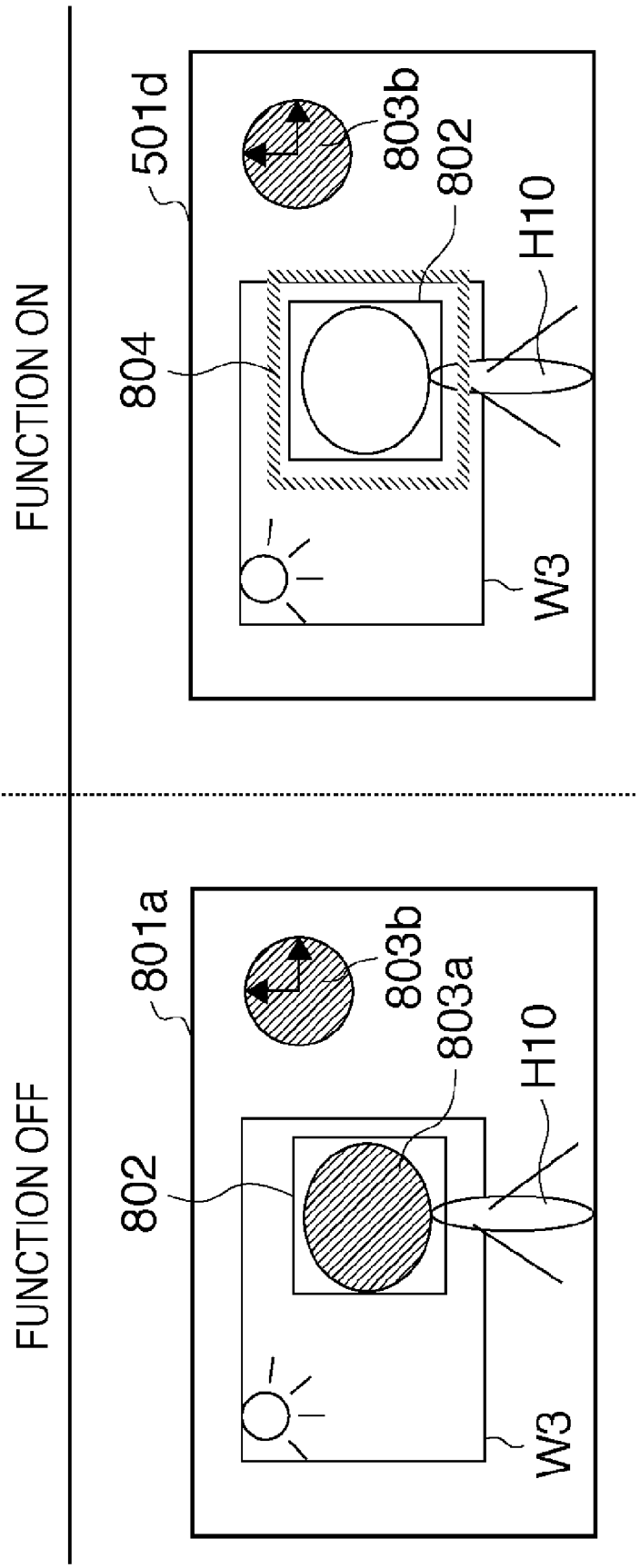
FIG. 8 is a conceptual view exemplifying a sensed image displayed on an image display unit in the third embodiment.

An image sensing apparatus according to the third embodiment will be described in detail with reference to FIGS. 7 and 8. The third embodiment is a modification to the first embodiment when a special image area detected by a special area detection unit 106 is an in-focus area. The arrangement of the apparatus is the same as that in the first embodiment, and a description thereof will not be repeated. FIG. 7 is a flowchart showing the display control operation of an image sensing apparatus 1. FIG. 8 is a conceptual view exemplifying a sensed image displayed on an image display unit 108.

Processing by a display control unit 107 will be explained. This processing is executed as the display control operation of the image sensing apparatus 1 under the control of a CPU 203 according to the third embodiment. In the third embodiment, the image display unit 108 displays a zebra pattern to be superimposed on an image sensed by an image input unit 101. A special image area detected by the special area detection unit 106 is an in-focus area.

As shown in FIG. 7, when display control processing starts, the display control unit 107 determines whether the user has turned on the image sensing apparatus 1 with the power switch of an operation unit 105 or the like (S201). If the display control unit 107 determines that the user has turned on the image sensing apparatus 1 (YES in S201), it determines whether the user has set zebra pattern display ON with the setting switch of the operation unit 105 or the like (S202). If the display control unit 107 determines that the user has set zebra pattern display ON (YES in S202), it determines whether the user has set, ON with the function switch of the operation unit 105 or the like, a function of performing display control based on an in-focus area detected by the special area detection unit 106 (S203).

If the display control unit 107 determines that the function of performing display control based on an in-focus area is OFF (NO in S203), it detects the luminance level of an image signal corresponding to each pixel of an input sensed image (S204). Then, the display control unit 107 determines whether the detected luminance level of the image signal corresponding to each pixel satisfies a preset condition and falls within a luminance level range for displaying a zebra pattern (S205). If the display control unit 107 determines that the detected luminance level of the image signal corresponding to each pixel falls within the luminance level range for displaying a zebra pattern (YES in S205), it superimposes a zebra pattern on the image signal (S206). If the display control unit 107 determines that the detected luminance level of the image signal corresponding to each pixel falls outside the luminance level range for displaying a zebra pattern (NO in S205), it does not superimpose a zebra pattern on the image signal. The display control unit 107 repeats the processes in S201 to S206 until the image sensing apparatus 1 is turned off.

If the display control unit 107 determines that the function of performing display control based on an in-focus area is ON (YES in S203), the special area detection unit 106 detects an in-focus area from the sensed image (S207). Similar to S204 and S205, the display control unit 107 detects the luminance level of an image signal corresponding to each pixel of the input sensed image (S208). The display control unit 107 determines whether the detected luminance level of the image signal falls within the luminance level range for displaying a zebra pattern (S209). If the display control unit 107 determines that the detected luminance level of the image signal corresponding to each pixel falls outside the luminance level range for displaying a zebra pattern (NO in S209), it does not superimpose a zebra pattern on the image signal.

If the display control unit 107 determines that the detected luminance level of the image signal corresponding to each pixel falls within the luminance level range for displaying a zebra pattern (YES in S209), it determines whether the image signal is that of a pixel falling within the in-focus area detected by the special area detection unit 106 (S210). If the display control unit 107 determines that the image signal is not that of a pixel falling within the in-focus area (NO in S210), it superimposes a zebra pattern on the image signal (S211). If the display control unit 107 determines that the image signal is that of a pixel falling within the in-focus area (YES in S210), it superimposes a zebra pattern in an image area other than the in-focus area (S212). The display control unit 107 repeats the processes in S201 to S203 and S207 to S212 until the image sensing apparatus 1 is turned off.

By this processing, the image display unit 108 of the image sensing apparatus 1 displays a sensed image exemplified in FIG. 8. Referring to FIG. 8, sensed images 801a and 801b are sensed images of a person H10 with a window frame W3 in the background. The image display unit 108 displays the sensed image 801a when the function of performing display control based on an in-focus area is OFF. The image display unit 108 displays the sensed image 801b when the function is ON.

When the function of performing display control based on an in-focus area is OFF, zebra patterns 803a and 803b are displayed to be superimposed in an in-focus area 802 in which the face of the person H10 is focused, and another area such as a clock without discriminating these areas, like the sensed image 801a. When the function of performing display control based on an in-focus area is ON, no zebra pattern is displayed in the in-focus area 802 detected as a special image area, and a zebra pattern 804 is displayed in an outer image area along the edge of the in-focus area. The zebra pattern 803b for the clock or the like other than an in-focus area is kept displayed. That is, the image sensing apparatus 1 displays a zebra pattern while changing the display method of zebra pattern display between an in-focus area and the remaining image area.

Fourth Embodiment

An image sensing apparatus according to the fourth embodiment will be described in detail with reference to FIGS. 9 and 10. The first, second, and third embodiments change the assist image display method when the sum of pixels to display an assist image in an object area detected by the special area detection unit 106 becomes equal to or larger than a predetermined ratio. In this case, however, the position of a pixel to display an assist image in the object area cannot be determined from the displayed assist image. To solve this, the fourth embodiment divides an object area into a plurality of small areas, also divides an assist image in correspondence with the positions of the divided small areas, and displays the divided assist images. More specifically, when displaying an assist image to be superimposed in an area other than an object area, the assist image is displayed finely so that a portion where pixels to display the assist image are distributed in the object area can be discriminated from an portion where no such pixel is distributed. The fourth embodiment is a modification to the first embodiment when a special image area detected by a special area detection unit 106 is a face area. The arrangement of the apparatus is the same as that in the first embodiment, and a description thereof will not be repeated.

Figure 9:
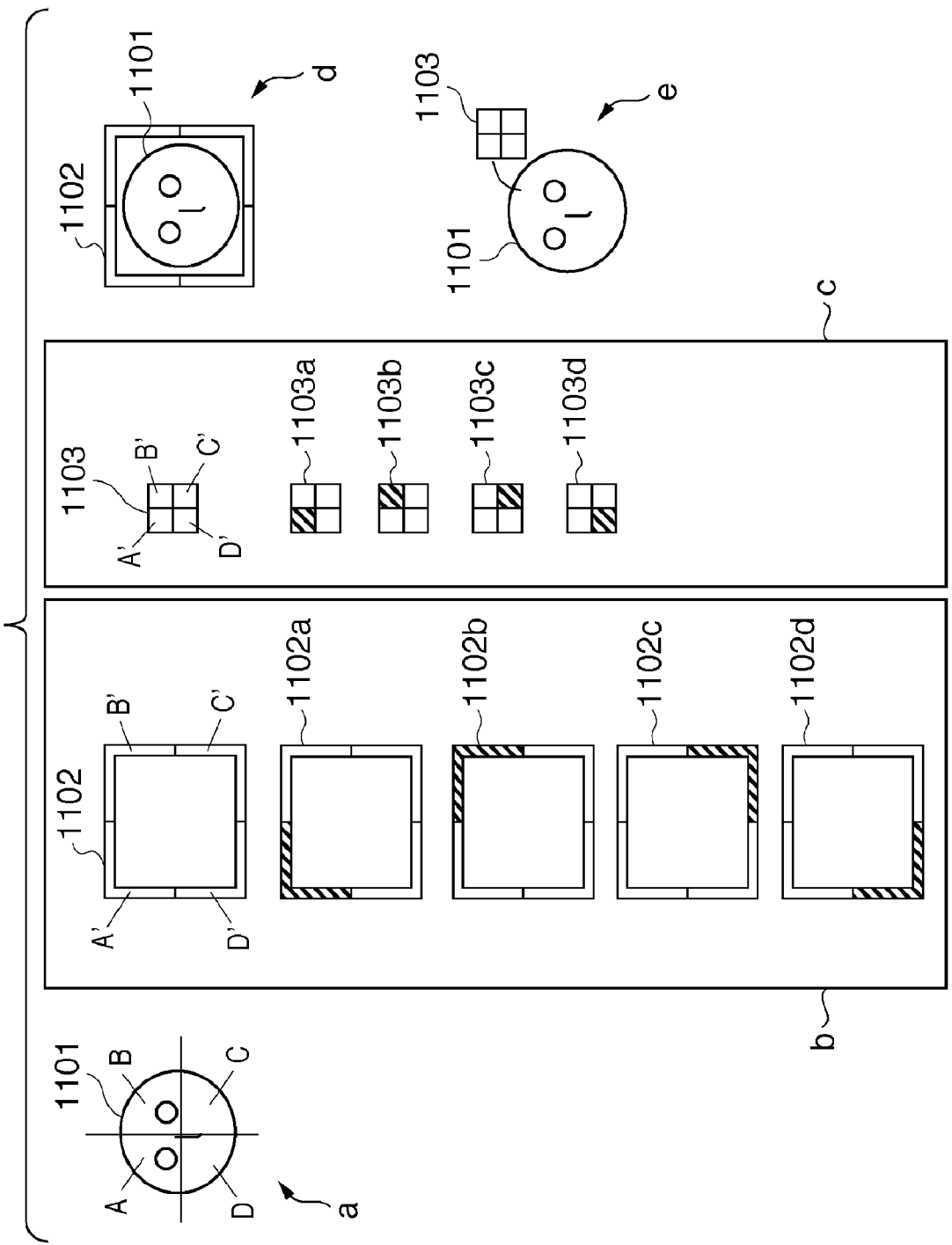
FIG. 9 shows conceptual views exemplifying the correspondence between a special area and an assist image according to the fourth embodiment.

FIG. 9 shows the display form of an assist image corresponding to a face area serving as a special image area. The fourth embodiment will explain a special image display form corresponding to a face area by using two patterns of a special image 1102 in b in FIG. 9 and a special image 1103 in c in FIG. 9. In the special image 1102, a zebra pattern is displayed in an outer image area along the edge of a face area. In the special image 1103, a zebra pattern is displayed in a tag area corresponding to a face area.

As shown in a in FIG. 9, a face area 1101 is divided into four areas A, B, C, and D. The special image 1102 or 1103 is also divided into four in correspondence with the four divided areas. Special image areas A', B', C', and D' correspond to the face areas A, B, C, and D. Special image displays 1102a and 1103a correspond to the face area A. Special image displays 1102b and 1103b correspond to the face area B. Special image displays 1102c and 1103c correspond to the face area C. Special image displays 1102d and 1103d correspond to the face area D. The conceptual views of displays combined with actual face areas are shown in d and e in FIG. 9.

Figure 10:
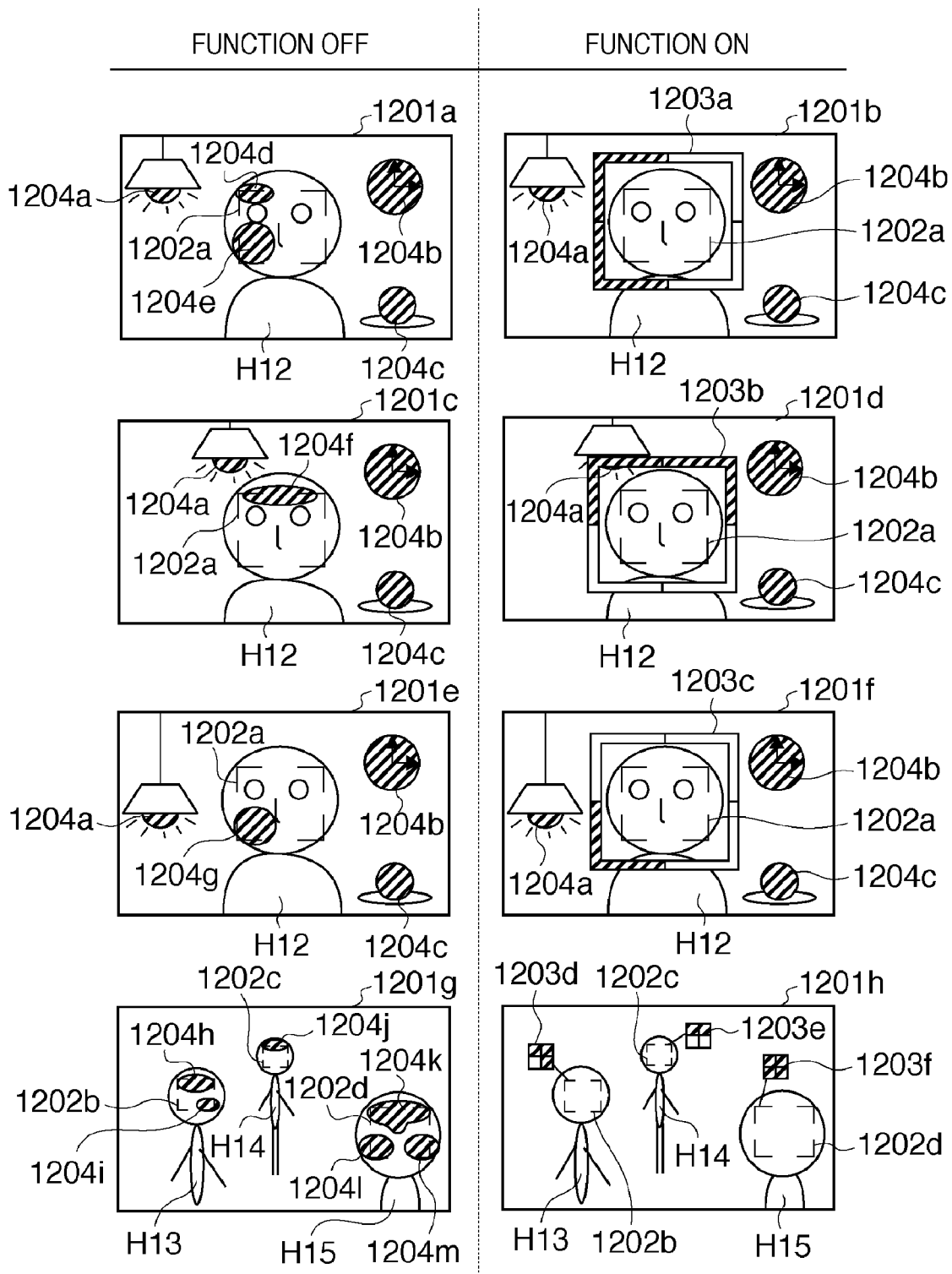
FIG. 10 is a conceptual view exemplifying a sensed image displayed on an image display unit in the fourth embodiment.

FIG. 10 is a conceptual view exemplifying a sensed image displayed on an image display unit in the fourth embodiment.

Sensed images 1201a 1201f are sensed images of a person H12. Sensed images 1201g and 1201h are sensed images of persons H13 to H15. An image display unit 108 displays the sensed images 1201a, 1201c, 1201e, and 1201g when the function of performing display control based on a face area is OFF. The image display unit 108 displays the sensed images 1201b, 1201d, 1201f, and 1201h when the function is ON. In the sensed images 1201b, 1201d, and 1201f, a zebra pattern is displayed in an outer image area along the edge of a face area, as represented by the special image 1102 of b in FIG. 9. In the sensed image 1201h, a zebra pattern is displayed in a tag area, as represented by the special image 1103 of c in FIG. 9.

When the function of performing display control based on a face area is OFF, zebra patterns 1204a to 1204m are displayed in face areas 1202a to 1202d of the persons H12 to H15 and other areas without discriminating them, like the sensed images 1201a, 1201c, 1201e, and 1201g. When the function of performing display control based on a face area is ON, no zebra pattern is displayed in the face areas 1202a to 1202d of the persons H12 to H15 that are detected as special image areas, and zebra patterns 1203a to 1203f corresponding to the four divided face areas are displayed in image areas outside the face areas. The zebra patterns 1204a to 1204c for the clock and the like other than face areas are kept displayed. That is, an image sensing apparatus 1 displays a zebra pattern while changing the zebra pattern display method of between a face area and the remaining image area.

Fifth Embodiment

Figure 11:
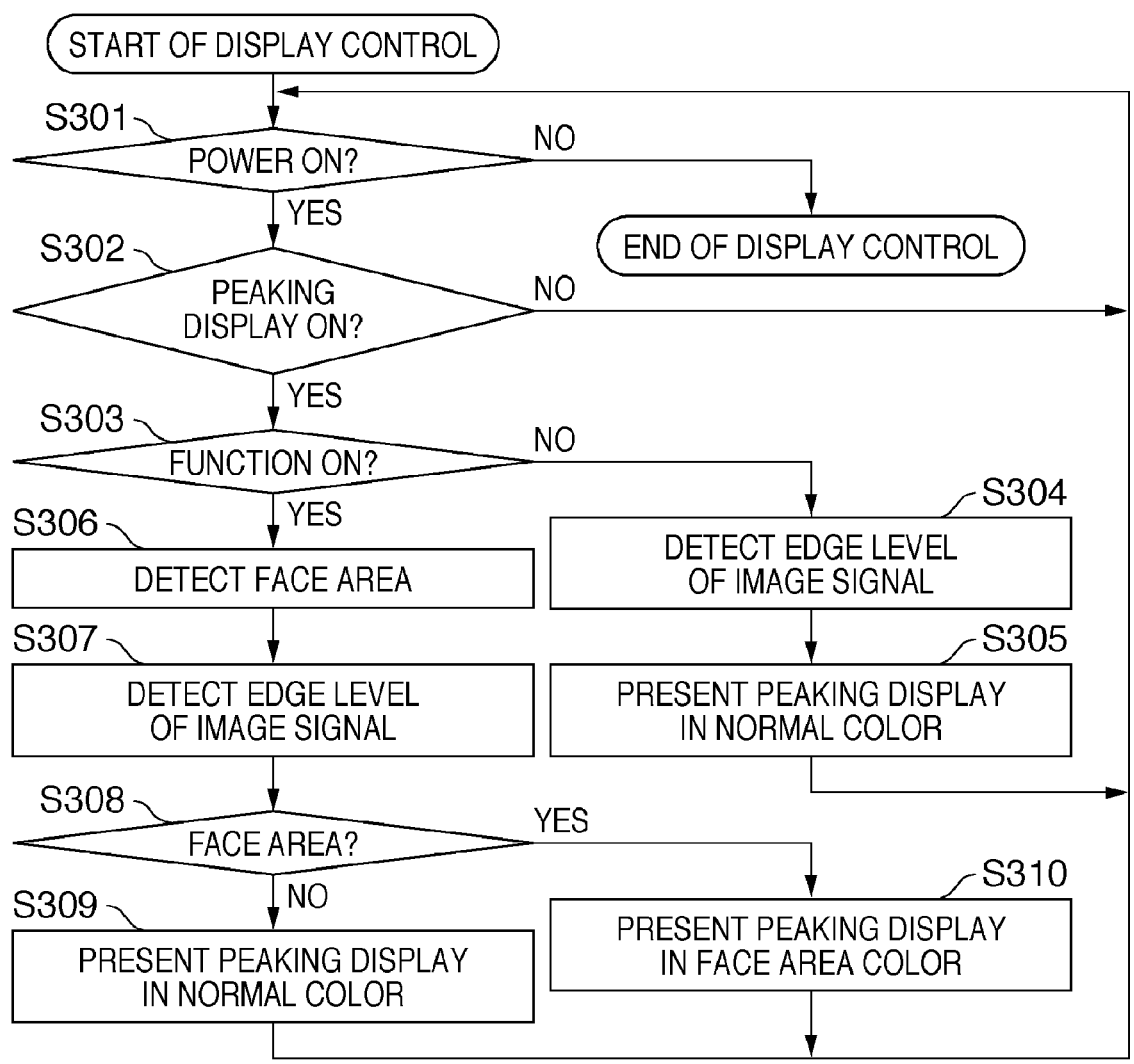
FIG. 11 is a flowchart showing the display control operation of an image sensing apparatus according to the fifth embodiment.

An image sensing apparatus according to the fifth embodiment will be described in detail with reference to FIGS. 11 and 12. The fifth embodiment is a modification to the first embodiment when an image display unit 108 presents a peaking display to be superimposed on an image sensed by an image input unit 101. The arrangement of the apparatus is the same as that in the first embodiment, and a description thereof will not be repeated. FIG. 11 is a flowchart showing the display control operation of an image sensing apparatus 1. FIG. 12 is a conceptual view exemplifying a sensed image displayed on the image display unit 108.

Processing by a display control unit 107 will be explained. This processing is executed as the display control operation of the image sensing apparatus 1 under the control of a CPU 203 according to the fifth embodiment. In the fifth embodiment, the image display unit 108 presents a peaking display to be superimposed on an image sensed by the image input unit 101. A special image area detected by a special area detection unit 106 is a face area.

As shown in FIG. 11, when display control processing starts, the display control unit 107 determines whether the user has turned on the image sensing apparatus 1 with the power switch of an operation unit 105 or the like (S301). If the display control unit 107 determines that the user has turned on the image sensing apparatus 1 (YES in S301), it determines whether the user has set peaking display ON with the setting switch of the operation unit 105 or the like (S302). If the display control unit 107 determines that the user has set peaking display ON (YES in S302), it determines whether the user has set, ON with the function switch of the operation unit 105 or the like, a function of performing display control based on a face area detected by the special area detection unit 106 (S303).

If the display control unit 107 determines that the function of performing display control based on a face area is OFF (NO in S303), it detects the edge level of the image signal of an input sensed image, i.e., executes the foregoing edge detection (S304). Then, the display control unit 107 superimposes a peaking display based on the detected edge on the sensed image in a normal display color, and displays it on the display screen of the image display unit 108. The display control unit 107 repeats the processes in S301 to S305 until the image sensing apparatus 1 is turned off.

If the display control unit 107 determines that the function of performing display control based on a face area is ON (YES in S303), the special area detection unit 106 detects a face area from the sensed image (S306). Similar to S304, the display control unit 107 detects the edge level of the image signal of the input sensed image, i.e., executes the above-described edge detection (S307). The display control unit 107 determines whether the detected edge falls within the face area detected by the special area detection unit 106 (S308). If the display control unit 107 determines that the detected edge falls outside the face area (NO in S308), it superimposes a peaking display based on the detected edge on the sensed image in a normal display color, and displays it on the display screen of the image display unit 108 (S309). If the display control unit 107 determines that the detected edge falls within the face area (YES in S308), it superimposes a peaking display based on the detected edge on the sensed image in a face area display color, and displays it on the display screen of the image display unit 108 (S310). The display control unit 107 repeats the processes in S301 to S303 and S306 to S310 until the image sensing apparatus 1 is turned off.

By this processing, the image display unit 108 of the image sensing apparatus 1 displays a sensed image exemplified in FIG. 12. Referring to FIG. 12, sensed images 901a and 901b are sensed images of a person H11 with a window frame W4 in the background. The image display unit 108 displays the sensed image 901a when the function of performing display control based on a face area is OFF. The image display unit 108 displays the sensed image 901b when the function is ON.

When the function of performing display control based on a face area is OFF, a peaking display 903 along the edge line of the person H11 is presented without discriminating the inside and outside of a detected face area 902 of the person H11, like the sensed image 901a. When the function of performing display control based on a face area is ON, a peaking display 904 is presented while discriminating the display color between the inside and outside of the face area 902. That is, the image sensing apparatus 1 presents a peaking display while changing the peaking display color between a face area and the remaining image area.

The above-described embodiments are merely examples, and the present invention is not limited to them. The arrangements and operations in the embodiments can be appropriately changed. For example, a zebra pattern for a special image area is displayed outside the special image area such as a face area or in-focus area. As exemplified in the fifth embodiment, a zebra pattern may also be displayed by changing the display color and display method between the inside and outside of a special image area. Also, a peaking display for a special image area may also be presented outside the special image area.

The above-described embodiments may also be combined. More specifically, the display method may also change a combination of the display color and the display form (e.g., flickering/non-flickering or line type). In other words, the assist image display method for a special image area in the image area of a sensed image and that for the remaining image area may also differ between each other in accordance with a combination of the display color and display form.

As described above, the image sensing apparatus 1 includes the display control unit 107 which controls the image display unit 108 to display an image sensed by the image input unit 101. The image sensing apparatus 1 also includes the signal strength detection unit 201 which detects, from a sensed image, a luminance area formed from pixels satisfying a predetermined luminance condition, and the special area detection unit 106 which detects, from a sensed image, an object area having a predetermined feature. The display control unit 107 controls the image display unit 108 to display an assist image representing the luminance area, so as to be superimposed on a sensed image. The display control unit 107 changes the assist image display method between a case in which the luminance area and object area overlap each other and a case in which they do not overlap each other. When displaying an assist image in an image area which meets a predetermined luminance condition, the image sensing apparatus 1 can display the assist image while discriminating an area overlapping an object area having a predetermined feature from the remaining area.

The display control unit 107 controls the image display unit 108 to present a pattern display representing a luminance area, so as to be superimposed on a sensed image. The display control unit 107 changes the display method of the pattern display between a case in which the luminance area and object area overlap each other and a case in which they do not overlap each other. Hence, the image sensing apparatus 1 can present a pattern display representing a luminance area while discriminating an area overlapping an object area having a predetermined feature from the remaining area.

The signal strength detection unit 201 detects the edge of an object from a sensed image. The special area detection unit 106 detects an object area containing a person's face. The display control unit 107 controls the image display unit 108 to present a peaking display representing the edge of the object, so as to be superimposed on a sensed image. Further, the display control unit 107 changes the display method of the peaking display between a case in which the edge of an object falls within the object area and a case in which it falls outside the object area. Accordingly, the image sensing apparatus 1 can present a peaking display representing the edge of an object while discriminating an area overlapping an object area having a predetermined feature from the remaining area.

Other Embodiments

The above-described embodiments can also be implemented as software by the computer (or CPU or MPU) of a system or apparatus. A computer program itself supplied to the computer in order to implement the embodiments by the computer also constitutes the present invention. That is, the present invention also includes the computer program for implementing the functions of the embodiments.

The computer program for implementing the embodiments can take any form such as an object code, a program executed by an interpreter, or script data supplied to an OS as long as the computer can read the program. However, the computer program is not limited to them. The computer program for implementing the embodiments is supplied to the computer by a storage medium or wired/wireless communication. The storage medium for supplying the program includes a flexible disk, hard disk, magnetic storage medium (e.g., magnetic tape), optical/magnetooptical storage medium (e.g., MO, CD, or DVD), and nonvolatile semiconductor memory.

The method of supplying the computer program using wired/wireless communication may use a server on a computer network. In this case, the server stores a data file (program file) serving as the computer program which constitutes the present invention. The program file may also be an executable file or source code. The program file is supplied by downloading it to a client computer which accesses the server. In this case, the program file can also be divided into a plurality of segment files to distributedly store the segment files in different servers. That is, the present invention also includes the server apparatus which provides a client computer with the program file for implementing the above-described embodiments.

It is also possible to encrypt the computer program for implementing the above-described embodiments, store the encrypted program in a storage medium, and distribute the storage medium to users. In this case, decryption key information is supplied to a user who satisfies a predetermined condition, permitting him to install the computer program in his computer. For example, the key information can be supplied by downloading it from a homepage via the Internet. The computer program for implementing the above-described embodiments may also utilize the function of an OS running on the computer. Further, the computer program for implementing the above-described embodiments may also be partially formed from firmware such as an expansion board mounted in the computer, or executed by the CPU of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-148323, filed Jun. 5, 2008 and 2009-065222, filed Mar. 17, 2009, which are hereby incorporated by reference herein in their entirety.

What is claimed is:

1. An image sensing apparatus comprising:
an image sensing unit;
a display unit;
a display control unit which controls the display unit to display an image sensed by the image sensing unit;
a first detection unit which detects, from the sensed image, a luminance area formed from pixels satisfying a predetermined luminance condition; and
a second detection unit which detects an object area having a predetermined feature from the sensed image,
wherein the display control unit controls the display unit to display an assist image representing the luminance area detected by the first detection unit, so as to be superimposed on the sensed image, and changes a display method of the assist image between a case in which the luminance area and the object area detected by the second detection unit overlap each other, and a case in which the luminance area and the object area do not overlap each other.

2. The apparatus according to claim 1, wherein when displaying the assist image representing the luminance area, the display control unit displays the assist image to be superimposed in an area where the luminance area and the object area do not overlap each other, and displays the assist image to be superimposed not in the object area but in an area other than the object area in an area where the luminance area and the object area overlap each other.

3. The apparatus according to claim 2, wherein when displaying the assist image to be superimposed in the area other than the object area, the display control unit divides the assist image into a plurality of small areas, and uses the plurality of small areas to display a portion where pixels satisfying the predetermined luminance condition are distributed in the object area, and a portion where pixels satisfying the predetermined luminance condition are not distributed.

4. The apparatus according to claim 1, wherein the display control unit changes at least one of a display color and hatching of the assist image between the case in which the luminance area and the object area overlap each other and the case in which the luminance area and the object area do not overlap each other.

5. The apparatus according to claim 1, wherein when the luminance area and the object area overlap each other, the display control unit sets an area for displaying the assist image at an end of a screen at which the area does not overlap the object area.

6. The apparatus according to claim 5, wherein when a plurality of areas where the luminance area and the object area overlap each other exist, the display control unit displays side by side a plurality of assist images associated with the plurality of areas.

7. The apparatus according to claim 1, wherein the second detection unit detects a person's face area as the object area.

8. The apparatus according to claim 1, wherein the second detection unit detects an in-focus area as the object area.

9. The apparatus according to claim 1, wherein the display control unit controls the display unit to display the assist image as an frame image which arranged at periphery of the object area when the luminance area overlaps with the object area.

10. An image sensing apparatus comprising:
an image sensing unit;
a display unit;
a display control unit which controls the display unit to display an image sensed by the image sensing unit;
a first detection unit which detects, from the sensed image, a luminance area formed from pixels satisfying a predetermined luminance condition; and
a second detection unit which detects an object area having a predetermined feature from the sensed image,
wherein the display control unit controls the display unit to display a pattern display representing the luminance area detected by the first detection unit, so as to be superimposed on the sensed image, and changes a display method of the pattern display between a case in which the luminance area and the object area detected by the second detection unit overlap each other, and a case in which the luminance area and the object area do not overlap each other.

11. An image sensing apparatus comprising:
an image sensing unit;
a display unit;
a display control unit which controls the display unit to display an image sensed by the image sensing unit;
a first detection unit which detects an edge of an object from the sensed image; and
a second detection unit which detects an object area containing a person's face from the sensed image,
wherein the display control unit controls the display unit to display a peaking display representing the edge of the object detected by the first detection unit, so as to be superimposed on the sensed image, and changes a display method of the peaking display between a case in which the edge of the object falls within the object area detected by the second detection unit, and a case in which the edge of the object falls outside the object area.

12. A method of controlling an image sensing apparatus having an image sensing unit and a display unit, the method comprising:
a display control step of controlling the display unit to display an image sensed by the image sensing unit;
a first detection step of detecting, from the sensed image, a luminance area formed from pixels satisfying a predetermined luminance condition; and
a second detection step of detecting an object area having a predetermined feature from the sensed image,
wherein in the display control step, the display unit is controlled to display an assist image representing the luminance area, so as to be superimposed on the sensed image, and a display method of the assist image is changed between a case in which the luminance area and the object area overlap each other and a case in which the luminance area and the object area do not overlap each other.

13. A method of controlling an image sensing apparatus having an image sensing unit and a display unit, the method comprising:
a display control step of controlling the display unit to display an image sensed by the image sensing unit;
a first detection step of detecting, from the sensed image, a luminance area formed from pixels satisfying a predetermined luminance condition; and
a second detection step of detecting an object area having a predetermined feature from the sensed image,
wherein in the display control step, the display unit is controlled to display a pattern display representing the luminance area, so as to be superimposed on the sensed image, and a display method of the pattern display is changed between a case in which the luminance area and the object area overlap each other and a case in which the luminance area and the object area do not overlap each other.

14. A method of controlling an image sensing apparatus having an image sensing unit and a display unit, the method comprising:
a display control step of controlling the display unit to display an image sensed by the image sensing unit;
a first detection step of detecting an edge of an object from the sensed image; and
a second detection step of detecting an object area containing a person's face from the sensed image,
wherein in the display control step, the display unit is controlled to display a peaking display representing the edge of the object, so as to be superimposed on the sensed image, and a display method of the peaking display is changed between a case in which the edge of the object falls within the object area, and a case in which the edge of the object falls outside the object area.

15. A non-transitory computer readable storage medium storing a program for causing a computer to execute steps of an image sensing apparatus control method defined in claim 12.

16. A non-transitory computer readable storage medium storing a program for causing a computer to execute steps of an image sensing apparatus control method defined in claim 13.

17. A non-transitory computer readable storage medium storing a program for causing a computer to execute steps of an image sensing apparatus control method defined in claim 14.

* * * * *